Patented Mar. 6, 1928.  1,661,368

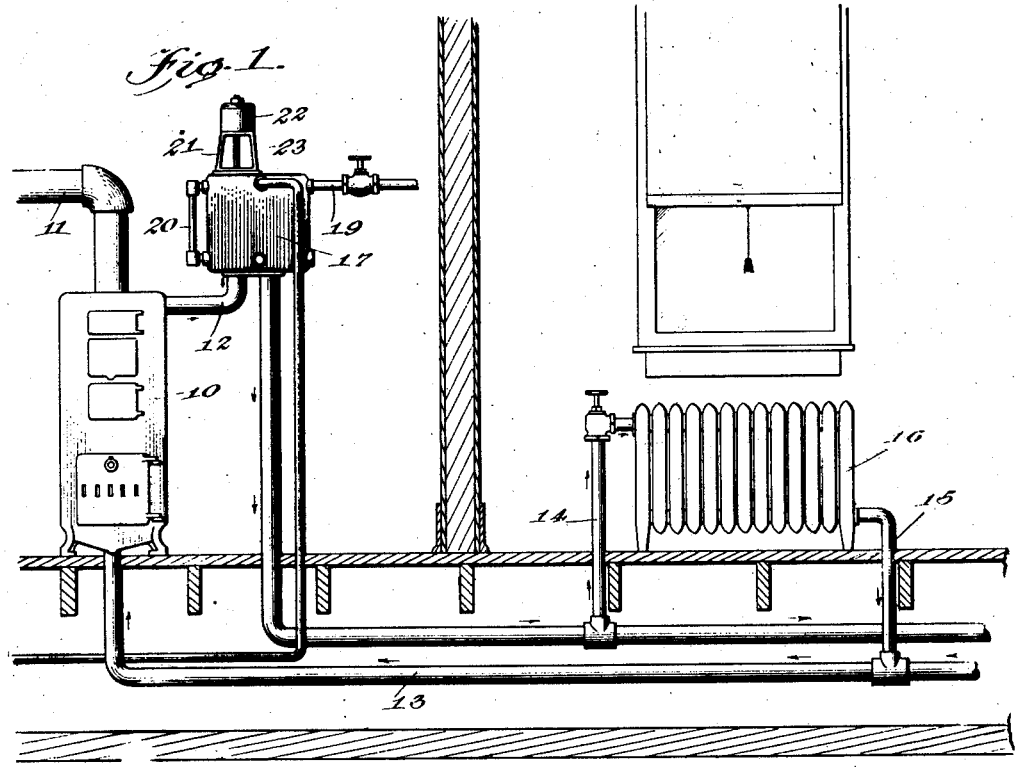
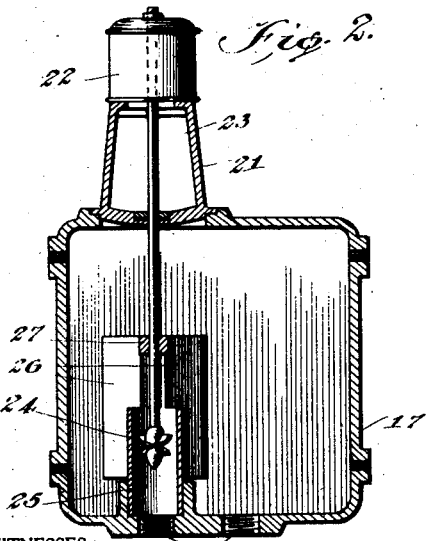
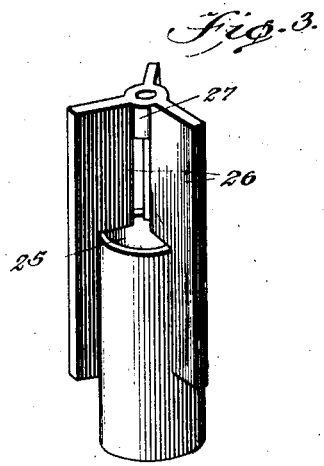

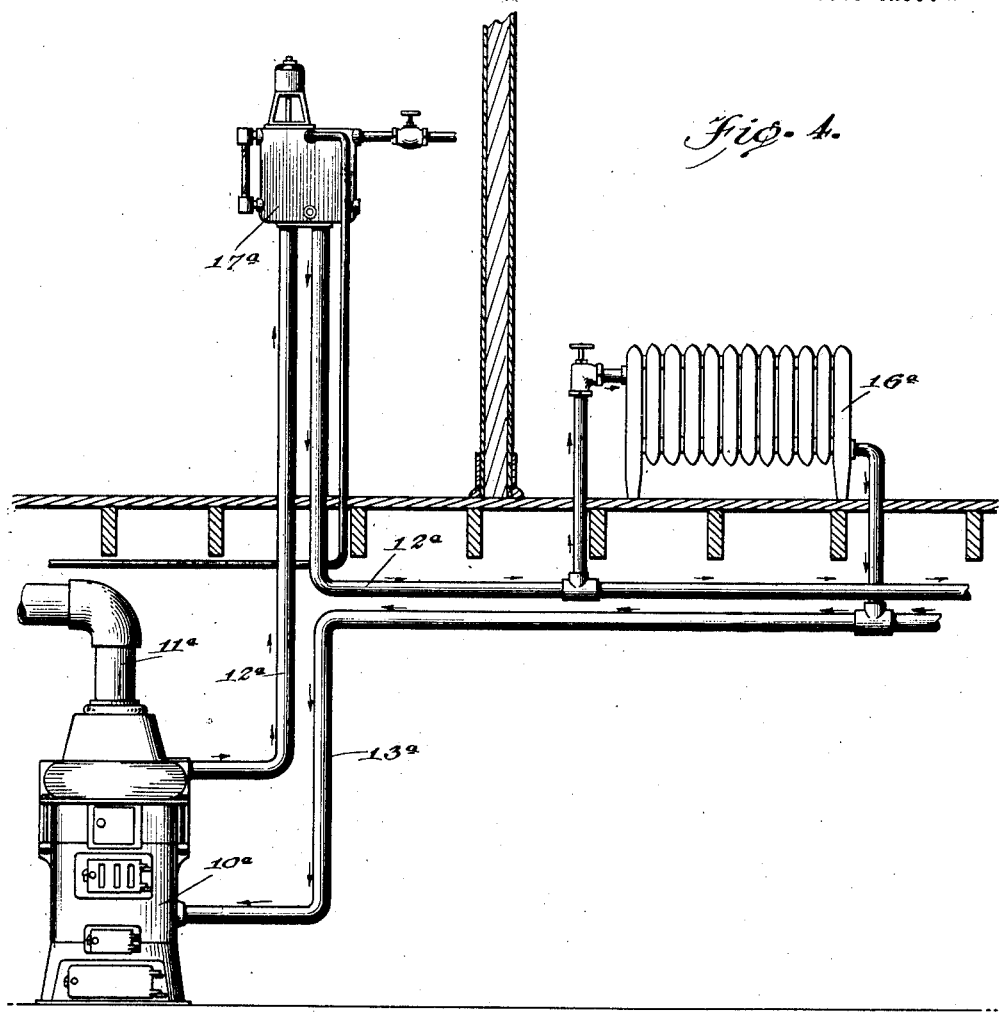
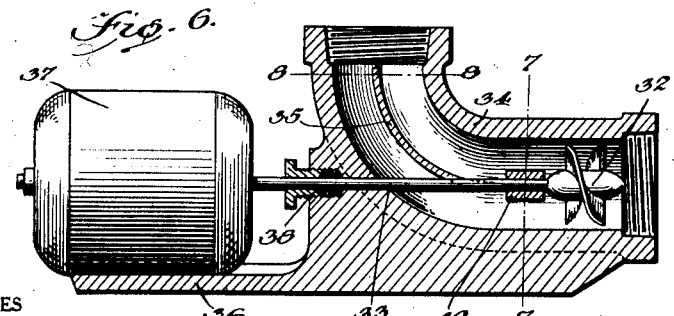

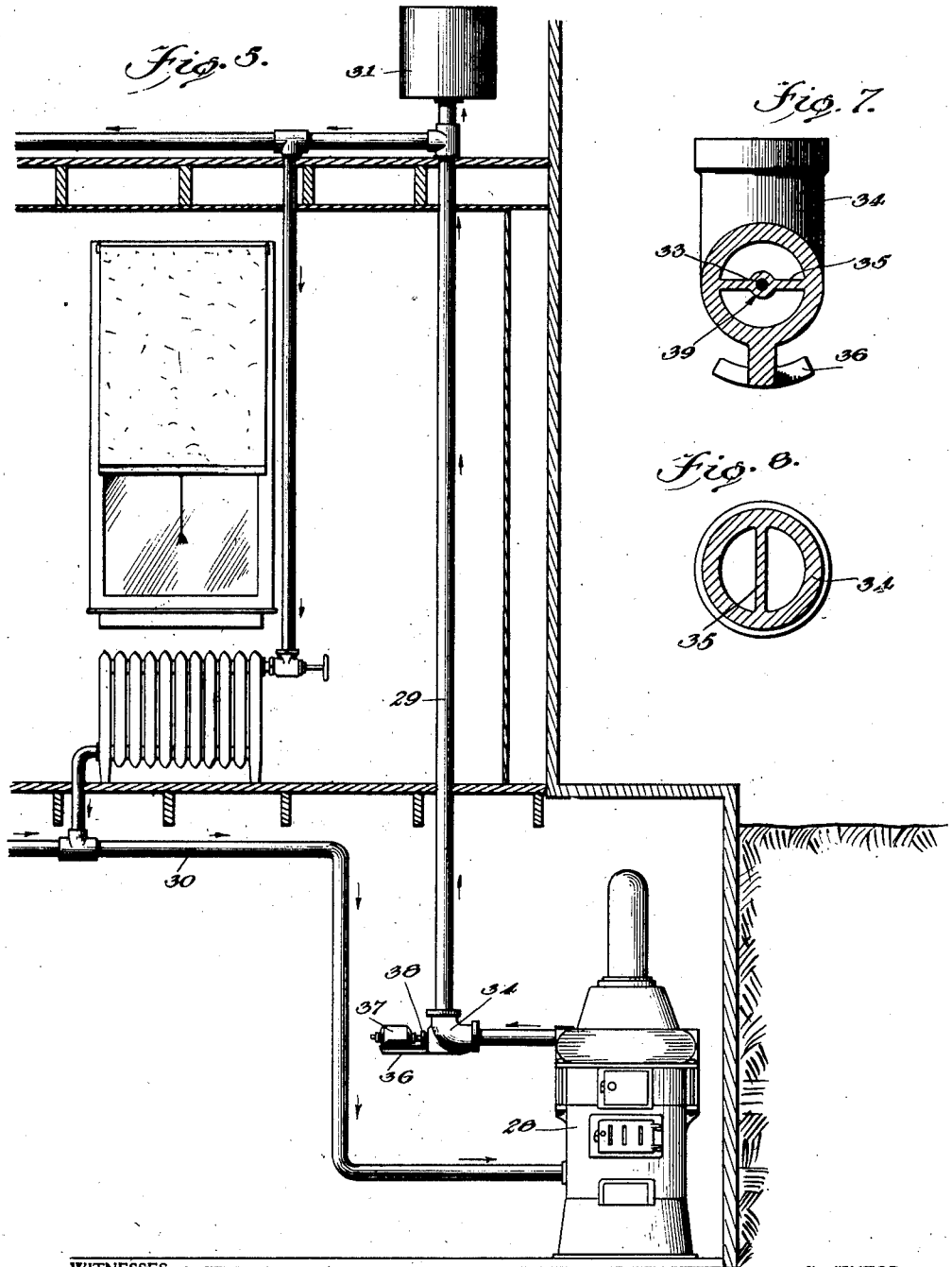

UNITED STATES PATENT OFFICE.

WILLIAM WALTER HUDSON, OF SALT LAKE CITY, UTAH.

HOT-WATER HEATING SYSTEM.

Application filed January 9, 1926. Serial No. 80,290.

My present invention relates generally to hot water heating systems, and has for its primary object the provision of means embodied in such systems in order to promote certain advantages and overcome certain disadvantages in systems of this character. It is a well known fact that in the ordinary hot water system certain rigid rules must be observed where as in most instances dependence is placed entirely upon the normal circulation of the water brought about by the difference in the weight of the fluid within the supply and return lines. It is true that it has been proposed to employ means for bringing about a forced circulation of the water in hot water systems, such for instance as pumps, but in these instances the cost of operation is excessive when the ordinary house system is taken into consideration. On the other hand in the usual system it often develops that radiators are desired in places where it is impossible to place them and a mild heat is desired in many instances where in order to maintain a circulation it is necessary to heat the water to a higher degree than that desired.

It is the object of my invention to provide in a hot water system in which the water circulates through supply and return lines under normal conditions by virtue of the difference in weight between the fluids in said lines with means adapted to act not as a pump for forcing circulation, but has an accelerator adapted to take advantage of the natural circulation and to aid such circulation when necessary, the nature of such means being such that where its aid is not necessary, the normal circulation as above may continue in the usual manner.

A further object is the provision of such means which may be operated in periods of extreme cold to continuously aid the normal circulation and increase the efficiency of the system, as well as one which in milder weather may be operated intermittently as required, to give just the desired heat, such as for instance periods of operation of just sufficient length to fill all radiators of the system with hot water from time to time where the source of heat of the water is insufficient to bring about a normal circulation.

In the accompanying drawing, in which I have shown several possible applications of my invention:—

Figure 1 is a sectional side view more or less diagrammatic showing the application of my invention in connection with a room type of hot water boiler.

Figure 2 is an enlarged detailed vertical section through the water tank of Fig. 1.

Figure 3 is a detailed perspective view of the shaft guide and fluid control member of Fig. 2.

Figure 4 is a sectional side view more or less diagrammatic showing the application of the invention to a cellar type of hot water boiler.

Figure 5 is a similar view illustrating a modified form of my invention as applied to a cellar type boiler.

Figure 6 is a vertical longitudinal section through the modified form of my invention as utilized in the system of Figure 5, and, Figures 7 and 8 are respectively a vertical and a horizontal section taken on the lines 7—7, 8—8, of Figure 6.

Referring now to these figures, I have generally outlined in Figure 1 a hot water heating system in which the source of heat is a hot water boiler indicated at 10, and of that type ordinarily employed within a room, 11 being the smoke pipe and 12 and 13 respectively being the hot water supply and return lines having supply and outlet pipes 14 and 15, respectively, establishing their communication with each radiator 16 of the system in the usual manner.

In this system I have shown a closed tank 17 arranged adjacent to the hot water boiler 10 and having connection at its base by virtue of threaded bottom openings 18 with portions of the hot water supply lines 12. This tank may have connected thereto a valved water supply pipe 19 for the system, and is preferably provided at one side with a gauge 20, the tank being adaptable to the installation of my invention, as well as to act as the usual expansion tank. To facilitate the application of my invention, the tank has an upper motor support 21 for a motor 22, whose shaft 23 depends into the tank and is provided at its lower end with a propeller 24 of the screw type located within an upright tube 25, whose lower end is seated around one of the base openings 18 just above mentioned. This tube has in connection with its upper portion a series of radially outstanding blades 26, connected at their upper ends by a member 27 which forms a bearing for the lower portion of the motor shaft 26 above the propeller 24. These blades 26 act to break up and prevent whirling of the water which might otherwise be caused by the rotation of the propeller 24 in the tube 25 under actuation of the motor 22.

It is obvious that for the purpose of taking advantage of and aiding the circulation, a motor 22 of but little power may be employed, and thus one capable of ready control with simple easy starting and stopping means, and it is likewise obvious that the propeller so situated within the fluid circulating line to act as and for the purposes mentioned, is such as to permit of the normal circulation when the motor is cut off and inactive.

As seen in Fig. 4 the same structure in so far as my invention is concerned, is utilized in an up-stairs room or attic in connection with a system employing a cellar boiler, the latter indicated at 10ª and having a smoke pipe 11ª and hot water supply and return lines 12ª and 13ª. The tank shown at 17ª in this figure as well as the remaining parts including the radiator 16ª, are the same as those above described in connection with Figures 1, 2 and 3.

In Figures 5 to 8 inclusive, I have, however, shown a slightly modified construction, this construction being employed in connection with a system such as shown in Figure 5, having a cellar boiler 28 with hot water supply, and return lines 29 and 30 respectively, and an attic expansion tank 31, my invention being applied in the form of a propeller 32 like that of Figures 1 to 4 inclusive mounted upon one end of a motor shaft 33 extending into an elbow 34, having a cross web 35. This elbow is connected between portions of the hot water supply line 29, as shown in Figure 5, and as most plainly seen in Fig. 6, may have an extension 36 adapted to form a support for a motor 37 for rotating the shaft 33. The shaft 33 enters the elbow through a stuffing box 38 and the cross web 35 within the elbow, one end of which may have a bearing 39 for the shaft 33, acts to break up and prevent whirling of the water which would otherwise be caused by the propeller 32 in action.

In operation as the motor shaft revolves in either case, the propeller by virtue of the pitch of its blade, sucks or drives water in the hot water supply line and this action induces an active circulation of the water through the system, no matter what the temperature of the water in the system may be. If the water is cooler than is required to maintain a circulation, the propeller acts to bring about such circulation, and in mild weather may be used with considerable advantage from time to time for this purpose. In colder weather where the water is heated sufficiently to maintain a normal circulation, the invention may be employed continuously to increase such circulation, and in this way increase the efficiency of the system as a whole.

Such acceleration of the circulation may in view of its necessitating but small power in the driving of the propeller, be employed economically in small house systems, and will result in greatly increased efficiency in so far as the general use of such systems is concerned, and will in addition permit of the placing of radiators where they are either on the same level or possibly below that of the boiler as in the system outlined in Fig. 1 of the drawing.

I claim:

1. A circulation accelerator for hot water heating systems comprising a tank to be interposed between portions of the hot water supply line, a tube positioned within said tank and forming a part of the fluid circulating line, a shaft depending into the tank and axially within said tube, a propeller on the lower end of the shaft within the tube, means for operating said shaft, and means about the tube and projecting above the free end thereof to break up and otherwise prevent whirling of the water.

2. A circulation accelerator for hot water heating systems comprising a tank to be interposed between portions of the hot water supply line and effective to act as an expansion tank, a tube positioned within said tank and forming the inlet to the tank from the fluid circulating line, a shaft depending into the tank and axially within said tube, a screw propeller on the lower end of the shaft within the tube, and a series of radial blades carried by the tube and projecting beyond its outlet end to break up and prevent whirling of the water.

3. A circulation accelerator for fluid circulating systems including an expansion tank, a tube projecting into the tank from the intake side of the system, a shaft depending into the tank and axially within said tube, a propeller on the lower end of said shaft within the tube, means for operating said shaft, and means carried by said tube to break up and otherwise prevent whirling of the fluid, said means also acting as a bearing for an intermediate portion of said shaft.

WILLIAM W. HUDSON.